US005907021A

United States Patent [19]

Turner et al.

[11] Patent Number: 5,907,021

[45] Date of Patent: May 25, 1999

[54] HIGH TEMPERATURE OLEFIN POLYMERIZATION PROCESS

[75] Inventors: Howard William Turner, Cupertino, Calif.; Charles Stanley Speed, Dayton, Tex.; Bernard Jean Folie, Houston, Tex.; Donna Jean Crowther, Baytown, Tex.; George Alan Vaughan, Houston, Tex.; Richard Allen Fisher, League City, Tex.; John Flexer Walzer, Jr., Seabrook, Tex.

[73] Assignee: Exxon Chemical Patents Inc., Houston, Tex.

[21] Appl. No.: 09/048,293

[22] Filed: Mar. 26, 1998

Related U.S. Application Data

[63] Continuation of application No. 08/769,191, Dec. 18, 1996, Pat. No. 5,767,208, which is a continuation-in-part of application No. 08/545,973, Oct. 20, 1995, abandoned

[60] Provisional application No. 60/008,893, Dec. 19, 1995.

[51] Int. Cl.[6] .................................................. C08F 4/642

[52] U.S. Cl. ......................... 526/160; 526/127; 526/132; 526/133; 526/151; 526/152; 526/348.2; 526/348.6

[58] Field of Search .................................... 526/127, 132, 526/133, 134, 151, 152, 160, 348.2, 348.6

[56] References Cited

U.S. PATENT DOCUMENTS

| | | |
|---|---|---|
| 5,017,714 | 5/1991 | Welborn, Jr. . |
| 5,066,631 | 11/1991 | Sangokoya et al. . |
| 5,084,534 | 1/1992 | Welborn, Jr. . |
| 5,153,157 | 10/1992 | Hlatky et al. . |
| 5,198,401 | 3/1993 | Turner et al. . |
| 5,264,405 | 11/1993 | Canich . |
| 5,278,119 | 1/1994 | Turner et al. . |
| 5,304,614 | 4/1994 | Winter et al. . |
| 5,321,107 | 6/1994 | Tsutsui et al. . |
| 5,324,800 | 6/1994 | Welborn, Jr. et al. . |
| 5,408,017 | 4/1995 | Turner et al. . |
| 5,434,115 | 7/1995 | Yamada et al. ..................... 526/133 X |
| 5,767,208 | 6/1998 | Turner et al. ........................... 526/160 |

FOREIGN PATENT DOCUMENTS

| | | |
|---|---|---|
| 0 500 944 A1 | 9/1992 | European Pat. Off. . |
| 0 570 982 A1 | 11/1993 | European Pat. Off. . |
| 0 612 768 A1 | 8/1994 | European Pat. Off. . |
| 41 39 263 A1 | 6/1993 | Germany . |
| WO 94/07927 | 4/1994 | WIPO . |
| WO 95/07941 | 3/1995 | WIPO . |
| WO 96/33227 | 10/1996 | WIPO . |

OTHER PUBLICATIONS

"Production of Polyacetylene", Patent Abstracts of Japan, Matsushita Electric Ind. Co., Ltd., vol. 14, No. 475, (C–0770), Oct. 17, 1990.

"High Temperature Olefin Polymerization Process", Research Disclosures, vol. 388, No. 035, Aug. 10, 1996.

*Primary Examiner*—Fred Teskin
*Attorney, Agent, or Firm*—W. G. Muller

[57] ABSTRACT

A polymerization process for olefinically or acetylenically unsaturated monomers is disclosed. The process comprises contacting the one or more of the monomers with a suitable ionic catalyst system in the presence of a long-chain, linear alkyl ligand-containing organo aluminum compound. Preferred ionic catalysts are derived from 1) bridged hafnium compounds, 2) silicon bridged monocyclopentadienyl titanium compounds and 3) unbridged, bulky Group 15 containing, bulky monocyclopentadienyl titanium compounds, and a non-coordinating anion precursor compound. A class of preferred anion precursors consists of hydrated salts comprising a Group 1 or 2 cation and a non-coordinating anion. Using the preferred ionic catalysts high temperature processes, e.g., at or above 90° C. can be conducted to prepare polyolefins, particularly ethylene copolymers, of both high molecular weight and high comonomer content.

7 Claims, No Drawings

HIGH TEMPERATURE OLEFIN POLYMERIZATION PROCESS

This application is a continuing application of U.S. Ser. No. 08/769,191, filed Dec, 18, 1996, now U.S. Pat. No. 5,767,208, issued Jun. 16, 1998 which is a continuation-in-part of U.S. Ser. No. 08/545,973, filed Oct. 20, 1995, now abandoned, and is a conversion of a Provisional Application Number 60/008,893 filed Dec. 19, 1995.

FIELD OF THE INVENTION

This invention relates to catalyst system selection and high temperature process conditions for polymerization of monomers containing ethylenic or acetylenic unsaturation wherein the catalyst system is single-sited and comprises a transition metal cation and a stabilizing, compatible non-coordinating anion.

BACKGROUND OF THE INVENTION

Ionic catalyst systems for olefin polymerization based on transition metal compounds such as metallocene compounds are recent but now well-known. Such metallocene compounds are based on transition metals capable of supporting at least one pi-bound aromatic ligand, typically a cyclopentadienyl or substituted cyclopentadienyl ligand and at least one additional ligand which can be abstracted so as to form a catalytically active cation structure. Co-catalyst anions are needed to stabilize these cations, which are highly reactive, but those anions must be capable of doing so without either closely coordinating with the cation that its reactivity, and thus polymerization activity, is diminished, or transferring an anionic fragment to the cation so as to alter its polymerization capability. Single coordination complexes and multinuclear coordination complexes based on the Group IIIA or 13 elements, such as boron or aluminum, have shown particular suitability as effective co-catalyst anion sources. See, the disclosures in EP-A-0 277 003, EP-A-0 277 004 and their equivalents, U.S. Pat. Nos. 5,198,401 and 5,278,119, particularly Examples 27 and 32. Example 32 of '119 discloses the use of bis(trimethylsilylcyclopentadienyl) hafnium dimethyl as the metallocene compound. Example 27 of '401 lists dimethylsilylbis (indenyl) zirconium dimethyl in column 9, line 16.

Homogeneous processes such as high pressure, high temperature polymerization processes, such as those at 500 bar and above, have shown particular suitability with such catalyst systems since these systems exhibit greater stability than those using alumoxanes co-catalysts at 160° C. and above. This allows for the greater productivity that occurs with greater reactivities at high temperature, the high pressure maintaining an essentially single phase reaction medium while permitting the higher temperatures. See U.S. Pat. No. 5,408,017 and equivalent WO-A-93/05732. A generic, broad description of suitable metallocene compounds is given as is a generic description of suitable anion precursors. The examples include the metallocene compounds dimethylsilylbis (4,5,6,7 tetrahydro-indenyl) zirconium dimethyl and dimethylsilylbis (4,5,6,7 tetrahydro-indenyl) hafnium dimethyl. The former showed significantly higher catalyst productivity (expressed as kg-PE/g-activator) in Table 2, ranging from 100 to 160, while that of the hafnium compound exhibited only 60. A similar olefin polymerization process that can be operated at high temperature and pressure is disclosed in WO 95/07941. The principal problem addressed is build up of polar material in recycle streams of the reactor, the solution is the use of bulky scavengers, e.g., those having at least one tertiary carbon atom, such as triisobutyl alumoxane. $Me_2Si(Ind)_2Hf\ Me_2$ is shown in Comparative Example 3 and Example 4, and said to be active longer and illustrative of high conversions.

The selection of substituents on the pi-bound, cyclopentadienyl ligands in the metallocene compounds has been identified as a means of increasing performance in olefin polymerization processes. For example, see U.S. Pat. No. 5,304,614 where specifically substituted indenyl ligands and their methods of preparation are described. Very high molecular weight polyethylene at high activity is said to be possible by use of the described metallocene compounds based on any of the group IVB, Vb or VIb metals. Zirconium and hafnium are said to be preferred and the preferred substituent structure is characterized by 1) alkylene or silylene groups bridging two cyclopentadienyl ligands bound to the metal atoms and 2) 4,7-substituted benzo groups fused on the respective sides opposite the H- or $C_2$ to $C_4$ 2-substituent on those same cyclopentadienyl groups. Examples 14–18 are of homopolymer polyethylene using specifically substituted bis(indenyl)zirconocenes with an alumoxane co-catalyst at a temperature of 70° C. and ethylene pressure of 5 bar. Productivity ranged from 35 to 56 g PE for 1 hour of polymerization reaction. The highest production was reported for $Me_2\ Si\ (3,4,7\text{-}Me_3Ind)_3\ Zr\ Cl_2$.

In EP-A1-0 612 768, bridged and unbridged hafnium metallocene compounds stabilized by non-coordinating anions after activated with alkyl-aluminum co-catalysts are said to demonstrate high catalyst activity over the zirconium analogues when utilized in processes at temperatures at or exceeding 120° C. The medium pressure solution processes are preferably to be conducted at pressures of 500 to 3500 $kg/cm^2$. All listed hafnocenes are dichloride-substituted embodiments and each of the working examples of the invention is alkylene bridged, with cyclopentadienyl, indenyl or fluorenyl pi-bound ligands.

Catalyst systems based on monocyclopentadienyl titanium compounds activated with alumoxane suitable for the preparation of ethylene-α-olefin copolymers of high molecular weight and high a-olefin content are described in U.S. Pat. No. 5,264,405. This patent teaches that the cyclopentadienyl group should be fully substituted with methyl groups and bridged to an amido group having an aliphatic or alicyclic hydrocarbyl ligand bonded through a 1° or 2° carbon. Copolymerization of ethylene with propylene in Example 45 with a bridged monocyclopentadienyl Group 4 metal catalyst compound at 80° C. produced a copolymer with 20 wt. % ethylene having an $M_n$ of about 20,080. In each Example 55 with the same catalyst as with Example 45, at a reaction temperature of 140° C., an ethylene-propylene copolymer having a density of 0.863, indicative of an amorphous ethylene copolymer, exhibited an $M_n$ of about 46,500.

Due to the sensitivities of ionic catalyst systems to polar impurities, solution polymerization processes utilizing scavenging compounds, for example alkyl aluminum compounds or alkyl alumoxanes, have been described. See, for example, U.S. Pat. Nos. 5,153,157 and 5,241,025, describing Group-IIIA metal scavenger compounds and processes. WO-A-94/07927 addresses a similar process as adapted for monocyclopentadienyl catalyst systems, it describes advantages of bulky scavengers when the monocyclopentadienyl catalyst compounds do not contain bulky substituents to impede interaction with the scavenging compounds. Triisoprenyl aluminum is exemplified and triisobutyl aluminum is listed along with tri-n-octyl and tri-n-hexyl aluminum as suitable bulky scavengers.

In view of the breadth of the disclosures concerning the use of metallocenes for olefin polymerization, and the general industrial need to employ the most effective catalysts and processes so as to have increased productivities while maintaining both comonomer incorporation and high molecular weight polymer preparation capability, additional investigative efforts were required. In particular general knowledge based on observations in the field gave rise to the traditional understanding that under temperatures exceeding about 80° C. increased comonomer incorporation using metallocene catalysts resulted in lower molecular weight polymer.

Invention Disclosure

It has been discovered in resulting investigations that even when subjected to the demanding conditions of high temperature in solution and high pressure processes, high molecular weight ethylene copolymers (M.I.≦10, preferably, M.I.≦1) can be polymerized in the presence of stable, single-sited discrete ionic catalyst systems, for example, those having cations derived from the transition metal compound group consisting of 1) bridged, unsubstituted- or substituted-indenyl, or fluorenyl group containing, hafnium compounds; 2) bridged hetero-atom containing, substituted or unsubstituted monocyclopentadienyl titanium compounds; 3) unbridged, bulky Group 15 containing, bulky monocyclopentadienyl titanium compounds; 4) Group 4 or 5 compounds containing bulky chelating diamide ancillary ligands; and 5) Group 8 metal diimine compounds wherein the metal is in a +2 oxidation state, such as Pd(II) and Ni(II). Accordingly the invention is in part a process for copolymerizing ethylene and at least one higher olefin, that is $C_3$ to $C_{20}$, preferably $C_4$ to $C_8$, alpha-olefin, diolefin, or $C_4$ to $C_{20}$ cyclic olefin, comprising the step of contacting said monomers with one or more of the stable, single-sited ionic catalysts with a cation above and a stabilizing, compatible non-coordinating anion in a polymerization reaction with a reaction medium temperature of 90° C. or above, and optionally at a pressure exceeding 50 bar, preferably exceeding 75 bar for solution processes and 500 bar for high pressure supercritical phase processes. The invention is also in part a modified process comprising the additional step of introducing into either the reaction medium, recycle stream or the monomer feedstocks prior to the polymerization reaction, a scavenger for polar impurities, most preferably a trialkyl aluminum each alkyl being a long-chain, linear-alkyl.

Detailed Description and Best Mode of the Invention

The bridged hafnium compounds of the invention include those having one or more carbon, silicon, or germanium atoms bridging two cyclopentadienyl (Cp) ligands of the hafnium metal centers, said ligands optionally containing one or more hydrocarbon substituents. When the Cp ligand is an indenyl or fluorenyl group, substitutions can be made either on the 5 or 6 member ring carbon atoms. Substituents typically include one or more $C_1$ to $C_{30}$ hydrocarbon groups selected from linear, branched, cyclic, aliphatic, aromatic or combined groups, whether in a fused-ring or pendant configuration. For the purposes of this application the term "hydrocarbon" is meant to include those compounds or groups that have essentially hydrocarbon characteristics but optionally contain not more than about 10 mol. % non-carbon, polar atoms, such as oxygen, sulfur, nitrogen and phosphorous. Similarly the use of hetero-atom containing cyclopentadienyl rings, where a non-carbon atom replaces one of the ring carbons, is considered for this specification to be within the terms "cyclopentadienyl", "indenyl", and "fluorenyl".

Specific bridged hafnium catalysts include those derived from: (1) indenyl-based complexes such as the rac- or meso-isomer of dimethylsilyl bis (indenyl)hafnium dimethyl, dimethylsilyl bis(4,5,6,7-tetrahydro-indenyl) hafnium dimethyl, dimethylsilyl bis(2-methyl-indenyl) hafnium dimethyl, dimethylsilyl bis(2-propyl-indenyl) hafnium dimethyl, dimethylsilyl bis(4-methyl, 2-phenyl-indenyl) hafnium dimethyl; (2) cyclopentadienyl complexes such as dimethylsilyl (cyclopentadienyl)(tetramethyl cyclopentadienyl) hafnium dibenzyl, dimethylsilyl bis (cyclopentadienyl) hafnium dimethyl; and (3) fluorenyl-based complexes such as dibutylsilyl (fluorenyl) (cyclopentadienyl) hafnium dimethyl and dimethylsilyl (indenyl) (fluorenyl) hafnium dihydride, or i-propyl (cyclopentadienyl) (fluorenyl) hafnium dimethyl.

In particular, for the bridged bis indenyl hafnium compounds, it has been found that increasing the degree of substitution on the indenyl ligands is effective for increased comonomer incorporation, an effect surprising in view of the general knowledge in the art. Thus when the indenyl substituents include at least two sigma bound hydrocarbon radicals replacing hydrogen atoms on the ring atoms, the performance exceeds that where either of zero substituents or just one substituent are present. For example dimethylsilyl bis(2-methyl, 4-phenyl-indenyl) hafnium dimethyl has been found to provide one or both of higher comonomer incorporation and higher molecular weight as compared to dimethylsilyl bis(2-methyl-indenyl) hafnium dimethyl, which is better in one or both of these features than dimethylsilyl bis(indenyl) hafnium dimethyl. Thus preferably the ligation on the indenyl radicals in the bulky hafnium compounds will generally comprise two or more $C_1$ to $C_{30}$ hydrocarbon substituents as defined above.

The silicon bridged hetero-atom containing, substituted or unsubstituted monocyclopentadienyl titanium compounds of the invention are any of those described in the art, see for example those described in U.S. Pat. No. 5,264,405, WO 92/00333 and U.S. Pat. No. 5,408,017. The substituted cyclopentadienyl ligand is one having hydrocarbon substituents as defined for the cyclopentadienyl, indenyl and fluorenyl ligands of the bridged hafnium compounds above. Each document in incorporated by reference for purposes of U.S. patent practice.

The unbridged, bulky Group 15 containing, bulky monocyclopentadienyl titanium compounds of the invention are unbridged titanium compounds having ancillary ligands including a substituted, bulky cyclopentadienyl ligand, a substituted, bulky Group 15 heteroatom ligand, and two uninegative, activation reactive ligands at least one of which that can be abstracted for activation of the remaining metal compound to a catalytically active state and one of which is either similarly abstractable or has a $\sigma$-bond to the transition metal into which an olefin or diolefin can insert for coordination polymerization. Typically, for any of the catalysts of this invention, uninegative, activation reactive ligands are selected from the group comprising hydride, lower alkyl, e.g., $C_1$ to $C_4$, or silyl. The bulky cyclopentadienyl ligand is one having substituents as defined for the cyclopentadienyl, indenyl or fluorenyl ligands of the bridged hafnium compounds above, particularly lower alkyl-substituted ligands, such as tetramethyl and pentamethyl cyclopentadienyl ligands. The bulky Group 15 heteroatom ligand is typically a hydrocarbon substituted Group 15 element, preferably nitrogen, wherein the hydrocarbon substituents are covalently bound to the heteroatom through a secondary or tertiary carbon or silicon atom. See also, copending application U.S. Ser. No. 08/545,973, filed Oct. 20, 1995 (Atty.

Docket No. 95B059) which is incorporated by reference for purposes of U.S. patent practice.

Ionic catalysts derived from Group IVB metal precursors where the ancillary ligand system does not contain a cyclopentadienyl ligand may also be employed in this invention. In general, these systems will be prepared from an ionic activator or Lewis Acid activator and a Group IVB metal containing precursor of the following general formula:

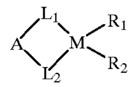

wherein:

A is an optional bridging substituent, $L_1$ and $L_2$ are the same or different non-Cp ancillary ligands, M is a Group IVB metal, and $R_1$ and $R_2$ are the same or different σ-bonded groups such as hydride or hydrocarbyl.

An example of a suitable non-Cp ancillary ligand system is described in "Conformationally Rigid Diamide Complexes: Synthesis and Structure of Tantalum(III) Alkyne Derivatives", D. H. McConville, el al, *Organometallics* 1995, 14, 3154–3156. Among the Group 4 metals, the Group 4 metals are preferred especially those of titanium. The Group 4 metal compounds will additionally comprise at least two uninegative, activation reactive ligands at least one of which that can be abstracted for activation of the remaining metal compound to a catalytically active state and one of which is either similarly abstractable or has a σ-bond to the transition metal into which an olefin or diolefin can insert for coordination polymerization. The Group 4 metal compounds having the described ligands can be prepared as illustrated in the *Organometallics* article except that the Group 5 metal halide is replaced with a Group 4 tetrahalide The $Ni^{2+}$ and $Pd^{2+}$ complexes of the invention are diimine complexes that can be prepared by methods equivalent to those used for the compounds described in "New Pd(II)- and Ni(II)-Based Catalysts for Polymerization of Ethylene and α-Olefins", M. Brookhart, el al, *J. Am. Chem. Soc.,* 1995, 117, 6414–6415. These can be either the dialkyl ether adducts as described, or alkylated reaction products of the described dihalide complexes that can be activated to a cationic state by the anion precursors according to the invention.

In general effective scavenging compounds for ionic polymerization catalysts include those aluminum alkyl compounds listed in U.S. Pat. Nos. 5,153,157 and 5,241,025. The term "scavenger" is used in its art-recognized sense of being sufficiently Lewis acidic to coordinate with polar contaminates and impurities adventiously occurring in the polymerization feedstreams or reaction medium. In particular, for processes utilizing recycle streams of unconverted monomer for reprocessing, the necessity to use polar compounds as catalyst deactivators, or "killers", such as water or lower alcohols, effectively necessitates the use of scavengers, as does the natural occurrence of polar impurities in monomer feedstreams. It has been discovered, however, that the use of excess scavenger has a deleterious effect on catalyst performance, and that the proper choice of scavenger is important to minimize the effects. Addition of excess scavenger causes lower productivity, molecular weight and comonomer incorporation. This effect can be easily seen by comparing Examples 1.2, 1.6, 1.7, and 1.8 in Table 1 of the examples section, when the addition of 6 equivalents of triethylaluminum (TEAL) caused an increase in productivity but as more TEAL was added productivity decreased as did the molecular weight and comonomer content of the product. Replacing TEAL with triisobutyl aluminum (TIBA) (Examples 1.9–1.12) improved the catalyst performance under excess scavenger conditions but did not completely remedy the situation.

Experiments under high temperature conditions showed similar trends. In order to further improve the performance of the ionic catalyst system, a systematic study of more substituted scavengers was carried out. Based on the observation that TIBA performed better than TEAL, it was expected that more highly substituted aluminum alkyl compounds, such as $Al(CH_2CMe_3)_2Me$, where Me is methyl, would be superior to TIBA because of the increase steric bulk around the Al atom. Comparative tests under high temperature conditions showed that $Al(CH_2CMe_3)_2Me$ was inferior to TIBA and caused sudden loss of productivity at very low levels of scavenger. Further studies showed that the preferred scavenger is a long chain, linear tri-alkyl aluminum compound, and that longer chains are preferred over shorter chains.

Non-limiting examples of effective long chain, linear tri-alkyl ligand-containing scavengers include those comprised in the group defined by the formula M'R'R"R'", where M' is Al, and each of the R groups independently is a $C_4$ or higher linear, branched or cyclic alkyl group, preferably $C_6$ or higher, most preferably $C_8$ or higher. The long chain, linear alkyl aluminums where each alkyl substituent was of a length of $C_8$ or higher, preferably $C_9$ and higher were observed to exhibit optimal performance, that defined as having the least deleterious effect when used at a level in excess of the optimum level as described in the following paragraph. Specifically included are: tri-n-octyl aluminum, tri-n-decyl aluminum, tri-n-dodecyl aluminum, tri-n-hexadecyl aluminum, and the higher carbon number equivalents, e.g., $(C_{20})_3Al$, including those with mixed ligation, and mixed scavenger compounds as well. The hydrolyzed derivatives of these alkyl-ligand containing organoaluminum compounds will additionally be suitable. Additionally, it will be apparent that those scavenging compounds comprising both long-chain, linear and bulky ligands or mixed linear ligands, each ligand as described above, will also be suitable, but perhaps less desirable due to more involved or expensive syntheses.

The long chain, linear-alkyl ligand-containing scavengers of the foregoing paragraph will be useful in any insertion polymerization process for olefinically or acetylenically unsaturated monomers with any of the ionic catalyst systems known in the art or those in development, where such make use of non-coordinating anions and the resulting catalyst sensitivities require elimination of polar impurities. Suitable catalyst systems appear in the catalyst references listed in the Background in this application, additional catalysts include those Group 5 and 6 transition metal catalyst systems of WO 94/01471 based on U.S. Ser. No. 08/086,772 filed Jul. 1, 1993, the disclosures of which are incorporated by reference for purposes of U.S. patent practice. Examples of suitable process conditions include those of gas phase, solution, slurry or bulk polymerization processes for any polymers or copolymers of two or monomers selected from the group consisting of ethylene, propylene, $C_4$–$C_{20}$ α-olefins, strained ring cyclic olefins, macromers of up to 100 or more mer units having olefinic unsaturation in the 1-position, or acetylenically unsaturated monomers. Such processes utilize −50° C. to 300° C. temperature and 0 to 3000 bar pressure. Polymers and copolymers having molecular weights equivalent to an M.I. of 100 and below can be prepared in these processes.

The scavengers, whichever are selected, should be utilized in a manner consistent with the sought productivity, polymer molecular weight, and polymer comonomer content. In particular, only that amount sufficient to neutralize the effects of the adventitious catalyst poisons should be utilized, the better purified the comonomer feedstreams into the reactor and as well the other feedstreams or added reactants and recycle, the less scavenger will be required. The amount is preferably as little as possible and can be adjusted empirically by observing the rates of reaction, adiabatic temperature rise, and other indicators of reaction efficiencies observable in the polymerization process, each being maximized holding all variables other than the addition of scavenger constant. Excess scavenger has been observed to cause a reduction in productivity, molecular weight and comonomer incorporation.

Means of preparing the ionic catalyst systems comprising cations of the described transition metal compounds and suitable non-coordinating anions are conventionally known, see for example U.S. Pat. No. 5,198,401 and WO 92/00333. Typically the methods comprise obtaining from commercial sources or synthesizing the selected transition metal compounds comprising an abstractable ligand, e.g., hydride, alkyl or silyl group, and contacting them with an ionizing non-coordinating anion source or precursor in an aromatic solvent. The anion source acts to ionize the transition metal compounds by abstracting the univalent hydride, alkyl or silyl ligand that complements its total valency. The abstraction leaves the transition metal compounds in a +1 cationic state, which is counterbalanced by the stable, compatible and bulky, non-coordinating anion. See the filler description in U.S. Pat. No. 5,198,401, referred to above. Conditions of adiabatic polymerization processes such as practiced at high pressure, result in temperatures exceeding 160° C. and above. These higher operating temperatures lead to increasing instability that is reflected in more difficult higher olefin comonomer incorporation and reduced molecular weight polymer. However, the single site catalysts of this invention under those same conditions evidence higher stability, greater comonomer incorporation and higher retained molecular weight as evidenced in the tabulated observations below.

The non-coordinating anion sources of the invention includes any of those conventionally known to be useful for olefin polymerization with metallocenes, including those known to be useful with the single cyclopentadienyl containing Group 4 transition metals. A representative listing of suitable anions is in U.S. Pat. No. 5,198,401, EP-A-0 426 637, EP-A-0 427 697, EP-A-0 520 732, EP-A-0 573 403, WO 95/24268 and U.S. Pat. No. 5,387,568. Those may be introduced into the catalyst preparation step as either ionic compounds having a cation which abstracts a non-cyclopentadienyl ligand of the transition metal compounds or as neutral compounds which upon abstraction of the non-cyclopentadienyl ligand, leave as a by-product the non-coordinating anion portion. Additionally, it is known that the use of alkylating compounds along with an anion source enables the use of transition metal compounds having ligands too strongly bound to the transition metal center to be abstracted by the anion source, e.g., transition metal dihalides. Typical alkylating sources may be any of the strongly Lewis acidic organoaluminum compounds such as the lower carbon number alkyl aluminums and alkylalumoxanes. See EP-A-0 500 944, EP-A-0 570 982 and EP-A1-0 612 768 for in situ processes describing the reaction of alkyl aluminum compounds with dihalo-substituted metallocene compounds prior to or with the addition of activating anion precursor compounds. Each of the above documents is incorporated by reference for purposes of U.S. patent practice. Most preferably transition metal compounds not having halide ligands on the metal center are used for the ionic catalyst systems of this invention since in situ alkylation processes may result in competing reactions and interactions that tend to interfere with the overall polymerization efficiency under conditions of high temperature in accordance with this invention.

A class of preferred anion precursor compounds are hydrated salts comprising a Group 1 or 2 cation and a non-coordinating anion as described above. The hydrated salts can be prepared by reaction of the metal cation-non-coordinating anion salt with water, for example, by hydrolysis of the commercially available or readily synthesized $LiB(pfp)_4$ which yields $[Li \cdot H_2O]$ $[B(pfp)_4]$, where (pfp) is penta- or perfluorophenyl. The by-product of ionization of the abstractable ligand-containing transition metal compounds with this precursor is LiOH which is non-volatile and thus is not recycled in the separation phase wherein the polymer is removed from monomer and any diluent prior to recycle. Tests have shown that this low-cost precursor operates to form ionic catalysts having properties essentially equivalent to those formed with the preferred precursor compounds represented by $[Ph_3C][B(pfp)_4]$ and $[PhMe_2NH][B(pfp)_4]$, Ph representing phenyl and Me representing methyl. As with the long chain, linear-alkyl ligand-containing scavengers noted above, this non-volatile by-product anion precursor will be suitable for use with any of the ionic catalyst systems known in the art or those in development, where such make use of non-coordinating anions. Catalytically suitable transition metal compounds capable of cationization include those Group 4 to 6 and 8 compounds addressed above. Again, examples of such include gas phase, solution, slurry and bulk polymerization processes for any polymers or copolymers of two or monomers selected from the group consisting of ethylene, propylene, $C_4$–$C_{20}$ α-olefins, strained ring cyclic olefins, macromers of up to 100 or more mer units having olefinic unsaturation in the 1-position, or acetylenically unsaturated monomers. Such processes utilize −50° C. to 300° C. temperature and 0 to 3000 bar pressure.

Known alkylalumoxanes are additionally suitable as catalyst activators for the invention single-site transition metal compounds comprising halide ligands, however these are less preferred since the alumoxane activators are less temperature stable at or above about 160° C. The alumoxane component includes all those useful as a catalyst activator, typically such will be an oligomeric aluminum compound represented by the general formula $(R—Al—O)_n$, which is a cyclic compound, or $R(R—Al—O)_nAlR_2$, which is a linear compound. In the general alumoxane formula R is a $C_1$ to $C_5$ alkyl radical, for example, methyl, ethyl, propyl, butyl or pentyl and "n" is an integer from 1 to about 50. Most preferably, R is methyl and "n" is at least 4. Alumoxanes can be prepared by various procedures known in the art. For example, an aluminum alkyl may be treated with water dissolved in an inert organic solvent, or it may be contacted with a hydrated salt, such as hydrated copper sulfate suspended in an inert organic solvent, to yield an alumoxane. Generally, however prepared, the reaction of an aluminum alkyl with a limited amount of water yields a mixture of the linear and cyclic species of the alumoxane.

A preferred process of polymerization is that conducted at high pressure, that is at from 200 to 3000 bar, preferably from 500 to 2500 bar in a homogeneous single phase or two fluid phases, with or without unreactive diluents or sulvents at temperatures generally above the melting point of the polymer being produced. Such processes are typically known and may include the use of scavenger compounds and catalyst deactivation or killing steps, see for example U.S. Pat. No. 5,408,017, WO 95/07941, and WO 92/14766. Each of these documents and their U.S. counterparts are incorporated by reference for purposes of U.S. patent practice. Preferred catalyst deactivators, or killers, include high molecular weight, non-recyclable compounds, such as poly vinyl alcohol which exhibit the functional capacity to complex with the catalysts so as to deactivate them while not forming volatile polar by-products or residual unreacted compounds.

Another preferred process in which any of the catalyst, cocatalyst and scavenger selections disclosed in this application can be advantageously practiced is that of a continuous, solution process operated at or above 90° C. to 120° C., even above 150° C. or above 160° C., up to about 300° C. Typically this process is conducted in an inert hydrocarbon solvent, linear, cyclic or branched aliphatic, or aromatic, at a pressure of from 20 to 200 bar. The disclosures of U.S. patent applications Ser. No. 08/426,363, filed Apr. 21, 1995, and Ser. No. 08/545,973 (Atty. Docket 95B059), filed Oct. 20, 1995, provide relevant description, even when operated at the elevated temperature ranges under supercritical conditions disclosed in this application. These documents also are incorporated by reference for purposes of U.S. patent practice.

For optimal polymerization results the processes should be designed or conducted such that the cocatalyst components, that is the transition metal compounds and the anion precursor compounds, are maintained separately until just prior to or during polymerization use in the chosen reactor. An example is the use of dual injection of each catalyst component directly into the reactor or the use of T- or multi-joint mixing chambers just prior to injection into the reactor. Alternatively the catalyst may be formed in-situ by the independent addition of ionic activator, ligand stabilized metal halide, and scavenger directly into the reactor or the use of T- or multi-joint mixing chambers just prior to injection into the reactor. Additional optimization can be achieved when the scavenger compound is introduced into the reactor independently of the catalyst system, or compounds.

Though directed specifically for high temperature, particularly high pressure or solution, processes, it will be apparent that the use of heterogeneous support material such as polymeric and metal or metalloid oxide supports will enable slurry or gas phase use of the process steps and components described and will likely achieve similar benefits of higher productivities, higher molecular weights, and higher levels of comonomer incorporation for the ethylene copolymer products capable of production using the disclosed copolymerizable monomers. Illustrative support methods appear in WO 91/09882, WO 94/00500, WO 94/03506, WO 94/07928, and in WO 96/04319 based on U.S. application Ser. No. 08/474,948 filed Jun. 7, 1995, in turn based on U.S. Ser. No. 08/285,380 filed Aug. 3, 1994. A suitable slurry process is described in U.S. Pat. No. 5,229,478. Each of the foregoing are incorporated by reference for purposes of U.S. patent practice.

The following examples are presented to illustrate the foregoing discussion. All parts, proportions and percentages are by weight unless otherwise indicated. Although the examples may be directed to certain embodiments of the present invention, they are not to be viewed as limiting the invention in any specific respect. Methods of determining MW and monomer contents by GPC and NMR for the illustrative EPC examples of the invention are described in U.S. Pat. No. 5,229,478 which is incorporated by reference for purposes of U.S. patent practice. For the following examples certain abbreviations have been utilized for convenience: Cp (cyclopentadienyl), Me(methyl), Ind (indenyl), Ph (phenyl), pfp (pentafluorophenyl), r-(racemic), Et (ethyl), Cp* (permethylated cyclopentadienyl), Cod (cyclododecyl), TOA (tri-n-octyl aluminum), TEAL (triethyl aluminum) and TIBA (triisobutyl aluminum).

EXAMPLES

Part 1: Laboratory Screening Experiments

The data from batch laboratory tests is summarized in Table 1. All polymerizations in Table 1 were carried out in a one liter stainless steel autoclave in 400 cc hexane with 45 cc hexene under 75 psi (517.11 kPa) ethylene head pressure at 60° C.

In each case the autoclave was filled with the solvent and hexene and heated under 75 psi (517.11 kPa) of ethylene until equilibrium was reached under rapid stirring. The catalyst was introduced into the reactor under these conditions and the temperature was maintained at 60° C.±/−5° C. for the duration of the run. The product was recovered and analyzed by GPC and $^{13}$C NMR spectroscopy to determine the molecular weight and comonomer content. An example of continuous process use of the information contained in Table 1 follows Example 1.1.

Example 1.1

A one liter mechanically stirred stainless steel autoclave was filled with 400 ml dry and deoxygenated hexane, 45 ml dry and deoxygenated hexene. The reactor was stirred rapidly, pressurized to 75 psi (517.11 kPa) with ethylene, and heated to 60° C. A catalyst solution in toluene containing $1.42\times10^{-5}$ moles of r-$Me_2Si(Ind)_2HfMe_2$ and $4.99\times10^{-5}$ $[PhMe_2NH][B(pfp)_4]$ was added to the reactor causing a polymerization reaction to occur. After 30 minutes the reactor was vented and the contents were poured into a flask. The solvent was evaporated to yield 5 grams of and ethylene/hexene copolymer having a $M_w$=151,000 Daltons, a $M_n$=74,000 Daltons, and 47.4 wt. % hexene. This represents a productivity of 714 grams PE/gram metallocene.

The results of the screening experiments collected in Table 1 demonstrate several important trends. These include the following observations.

Bridged vs. Unbridged Metallocenes

Bridged have 2–3 times the comonomer incorporation (see $Cp_2HfMe_2$ vs. $Et_2SiCp_2HfMe_2$ or $CpCp^*HfMe_2$ vs. $Me_2SiCpCp^*HfMe_2$).

Bridged complexes produce higher MW products.

Bridged complexes typically show higher activities.

$[PhMe_2NH][Bpfp)_4]$ vs. $[Ph_3C]Bpfp)_4]$ vs. $[Li\cdot H_2O][Bpfp)_4]$

All appear to produce the same polymer at similar rates.

The Effect of Scavengers on Catalyst Performance

High levels cause lower MW and comonomer content.

Low levels improve productivity without affecting product.

TIBA better than TEAL in terms of effect on product at high levels of scavenger.

high levels depress productivity.

$_2Si(Ind)_2HfMe_2$ vrs. $Me_2Si(4\text{-}Me,2\text{-}PhInd)_2HfMe_2$

Substituted system shows higher MW even at high comonomer content.

Substituted system shows significant increases in comonomer incorporation.

The metallocene dichloride route vrs. the metallocene dialkyl route

The chloride free approach produces high MW and comonomer content products.

Zr vrs. Hf

Hf systems superior in terms of MW and comonomer incorporation.

Mono-Cp Ti vrs. bis-Cp Hf Catalysts

The bis-Cp Hf systems can be modified to have similar performance to the mono-Cp systems.

Part 2: Continuous High Pressure Operation

The polymerization reactions in Table 2 were performed in a stirred 1.5 L steel autoclave reaction vessel which was equipped to perform continuous Ziegler polymerization reactions at pressures up to 2000 bar and temperatures up to 300° C. The reaction system was supplied with a thermocouple and pressure transducer to measure temperature and pressure continuously, and with means to supply continuously purified compressed ethylene and 1-butene. Pressure was controlled by pressure reduction valve. Equipment for continuously introducing a measured flow of catalyst solution, and equipment for rapidly venting and quenching the reaction, and of collecting the polymer product were also a part of the reaction system. The ability to add scavenger to the fresh feed prior to the reactor was provided by a high pressure pump. The polymerization was performed with a specified molar ratio of ethylene to comonomer and without the addition of a solvent. The temperature of the reactor containing ethylene and comonomer was equilibrated at the desired reaction temperature. The catalyst solution was prepared by mixing a specified amount of solid metallocene component with the activator component in toluene under an inert atmosphere. This catalyst solution was continuously fed by a high pressure pump into the reactor at a rate which resulted in the desired reactor temperature. The reactor contents were stirred at 1000 rpm and the reactor feed mass flow rate typically used was 40 kg/hr. Exact run conditions including catalyst preparation metallocene component (M) (g), activator component (A) (g), and total volume of solution (L) scavenger aluminum compound to transition metal compound with molar rate (Al:M), catalyst production polymer production rate (kg polymer/hr) average, comonomer molar feed ratio (e.g. $C_4/C_2$), reactor mass flow rate (kg/hr), and polymer characteristics including melt index (g/10 minutes at 190° C.), and weight percent comonomer (determined by IR), are also collected in Table 2. All polymerizations were carried out at 225° C. and 1300 bar. The catalyst solutions were prepared using dry and deoxygenated toluene. An example of how to use the information contained in Table 2 follows Example 2.1.

Example 2.1

Using the reactor design as described above, and using a molar ratio of the ethylene to 1-butene of 0.55 without the addition of a solvent, the temperature of the cleaned reactor containing ethylene and 1-butene was equilibrated at the desired reaction temperature of 225° C. The catalyst solution was prepared by mixing 0.496 g of solid compound r-$Me_2Si(Ind)_2HfMe_2$ with 0.9788 activator compound $(Ph_3C)^+B(pfp)_4^-$ in 20 liter toluene. This catalyst solution was continuously fed by a high pressure pump into the reactor at a rate which resulted in a temperature of 225° C. in the reactor. During this run, ethylene and 1-butene was pressured into the autoclave at a total pressure of 1300 bar. The reactor contents were stirred at 1000 rpm, and the mass feed flow rate through the reactor was held constant at 40 kg/hr. Polymerization was conducted for a 60 to 90 sec. residence time. The yield of polymer product was 6.6 kg/hr. of an ethylene-1-butene copolymer which had a MI of 2.85 and a comonomer incorporation of 13 weight percent butene as measured by IR. Transition metal productivity was calculated at 267 kg polymer/g metallocene.

TABLE 1

| Exp # | Metallocene | Activator | Mole Met | Mole Act. | Scav. | A1:M |
|---|---|---|---|---|---|---|
| 1.1 | r-$Me_2Si(Ind)_2HfMe_2$ | $[PhMe_2NH][B(pfp_4]$ | 7.28E-05 | 2.50E-06 | none | none |
| 1.2 | r-$Me_2Si(Ind)_2HfMe_2$ | $[Ph_3C][B(pfp)_4]$ | 1.46E-05 | 4.88E-06 | none | none |
| 1.3 | r-$Me_2Si(Ind)_2HfMe_2$ | $LiB(pfp)_4.H_2O$ | 9.10E-05 | 2.91E-05 | none | none |
| 1.4 | r-$Me_2Si(Ind)_2HfMe_2$ | $LiB(pfp)_4.H_2O$ | 2.83E-05 | 1.16E-05 | TIBA | 1 |
| Comp 1.5 | r-$Me_2Si(Ind)_2HfMe_2$ | $[Ph_3C][B(pfp)_4]$ | 3.44E-06 | 3.25E-06 | TEAL | 6 |
| Comp 1.6 | r-$Me_2Si(Ind)_2HfMe_2$ | $[Ph_3C][B(pfp)_4]$ | 7.89E-06 | 7.59E-06 | TEAL | 76 |
| Comp 1.7 | r-$Me_2Si(Ind)_2HfMe_2$ | $[Ph_3C][B(pfp)_4]$ | 8.90E-06 | 8.68E-06 | TEAL | 335 |
| Comp 1.8 | r-$Me_2Si(Ind)_2HfMe_2$ | $[Ph_3C][B(pfp)_4]$ | 1.21E-06 | 1.08E-06 | TIBA | 18 |
| Comp 1.9 | r-$Me_2Si(Ind)_2HfMe_2$ | $[Ph_3C][B(pfp)_4]$ | 2.22E-06 | 2.17E-06 | TIBA | 50 |
| Comp 1.10 | r-$Me_2Si(Ind)_2HfMe_2$ | $[Ph_3C][B(pfp)_4]$ | 6.67E-06 | 6.51E-06 | TIBA | 335 |
| Comp 1.11 | r-$Me_2Si(Ind)_2HfMe_2$ | $[Ph_3C][B(pfp)_4]$ | 7.89E-06 | 7.59E-06 | TIBA | 569 |
| *Comp 1.12 | r-$Me_2Si(Ind)_2HfCl_2$ | $[PhMe_2NH][B(pfp)_4]$ | 1.87E-05 | 6.24E-06 | TEAL | 16 |
| *Comp 1.13 | F$Me_2Si(Ind)_2HfCl_2$ | $[Ph_3C][B(pfp)_4]$ | 9.34E-06 | 3.58E-08 | TEAL | 32 |
| 1.14 | $Cp_2HfMe_2$ | $[Ph_3C][B(pfp)_4]$ | 2.65E-05 | 8.68E-06 | none | none |
| *Comp 1.15 | $Cp_2HfCl_2$ | $[PhMe_2NH][B(pfp)_4]$ | 4.08E-05 | 9.99E-06 | TEAL | 5 |
| 1.16 | Et2Si$Cp_2HfMe_2$ | $[Ph_3C][B(pfp)_4]$ | 3.20E-05 | 3.15E-05 | none | none |
| 1.17 | $CpCp^*HfMe_2$ | $[Ph_3C][B(pfp)_4]$ | 9.55E-06 | 3.25E-06 | none | none |
| 1.18 | $Me_2SiCpCp^*HfMe_2$ | $[Ph_3C][B(pfp)_4]$ | 1.44E-05 | 5.42E-06 | none | none |
| 1.19 | r-$Me_2Si(4Me,2PhInd)_2HfMe_2$ | $[PhMe_2NH][B(pfp)_4]$ | 1.48E-05 | 4.99E-06 | none | none |
| 1.20 | r-$Me_2Si(4MeInd)_2ZrMe_2$ | $[Ph_3C][B(pfp)_4]$ | 1.84E-05 | 1.52E-05 | none | none |
| 1.21 | $Me_2SiCp^*N(Cod)TiMe_2$ | $[Ph_3C][B(pfp)_4]$ | 3.09E-05 | 2.49E-05 | none | none |

| Exp # | T (min.) | Yield (gr) | Mw (K) | Mn | MW | Wt % $C_6$ | Productivity |
|---|---|---|---|---|---|---|---|
| 1.1 | 30 | 7 | 149 | 79 | 1.8 | 46.8 | 1944 |
| 1.2 | 30 | 9 | 148 | 78 | 1.8 | 49.2 | 1286 |

TABLE 1-continued

| | | | | | | | |
|---|---|---|---|---|---|---|---|
| 1.3 | 1 | 26 | 74 | 34 | 2.1 | 55.5 | 578 |
| 1.4 | 30 | 19 | 141 | 75 | 1.8 | 51.4 | 1357 |
| Comp 1.5 | 30 | 40 | 120 | 53 | 2.2 | 50.2 | 23529 |
| Comp 1.6 | 30 | 3 | 51 | 23.4 | 2.1 | 39 | 769 |
| Comp 1.7 | 30 | 3.5 | 34.8 | 17.5 | 1.9 | 31.5 | 750 |
| Comp 1.8 | 30 | 17 | 161 | 82.7 | 1.9 | 44.3 | 31667 |
| Comp 1.9 | 30 | 12 | 138 | 70.8 | 1.9 | 52.4 | 10909 |
| Comp 1.10 | 30 | 3.5 | 92.8 | 44.8 | 2.0 | 47 | 1061 |
| Comp 1.11 | 30 | 8 | 89.1 | 47.4 | 1.8 | 46.8 | 2051 |
| *Comp 1.12 | 30 | 20 | 77.2 | 34.8 | 2.2 | 36 | 2000 |
| *Comp 1.13 | 30 | 15 | 96.3 | 46.7 | 2.0 | 40.8 | 2157 |
| 1.14 | 30 | 1.5 | 351 | 147 | 2.3 | 24.4 | 170 |
| *Comp 1.15 | 30 | 13 | 36.6 | 22.8 | 1 | 11.4 | 855 |
| 1.16 | 30 | 13 | 86.1 | 43.7 | 1.9 | 43.1 | 963 |
| 1.17 | 30 | 3 | 113.9 | 57.7 | 1.9 | 11.1 | 769 |
| 1.18 | 30 | 8 | 140.5 | 35.6 | 3.9 | 32 | 1231 |
| 1.19 | 30 | 32 | 220 | 108 | 2.0 | 56.2 | 3200 |
| 1.20 | 30 | 5 | 87.7 | 46.3 | 1.8 | 38.5 | 625 |
| 1.21 | 30 | 8 | 247 | 96.7 | 2.5 | 71.9 | 593 |

*In-situ activation, dual functioning of alkylaluminum.
Comp indicates comparative example.

TABLE 2

| Exp # | Metallocene (M) | Weight M (gr) | Activator (A) | Weight A (gr) | Volume Toluene (L) | M:A Mole Ratio | Scav | A1:M | $C_4$:$C_2$ | MI | Production Rate (Kg/hr) | wt % $C_4$ | KgPE/gM |
|---|---|---|---|---|---|---|---|---|---|---|---|---|---|
| 2.1 | r-$Me_2Si(Ind)_2HfMe_2$ | 0.496 | trityl$^+B(pfp)_4^-$ | 0.978 | 20 | 0.94 | TOA | 33 | 0.55 | 2.85 | 6.6 | 13 | 267K |
| 2.2 | r-$Me_2Si(Ind)_2HfMe_2$ | 0.552 | $DMAH^+B(pfp)_4^-$ | 0.957 | 20 | 0.93 | TOA | 34 | 0.55 | 3.02 | 6.1 | 13.7 | 251K |
| 2.3 | r-$Me_2Si(Ind)_2HfMe_2$ | 0.662 | $DMAH^+B(pfp)_4^-$ | 0.932 | 20 | 1.1 | TOA | 32 | 1 | 25.1 | 6.3 | 25.4 | 178K |
| 2.4 | r-$Me_2Si(2Me,4PhInd)_2HfMe_2$ | 0.891 | $DMAH^+B(pfp)_4$ | 1.063 | 20 | 0.99 | TOA | 55 | 1 | 63.3 | 6 | 38.5 | 290K |
| 2.5 | r-$Me_2Si(2Me,4PhInd)_2HfMe_2$ | 0.891 | $DMAH^+B(pfp)_4$ | 1.063 | 20 | 1 | TOA | 9 | 0.6 | 9.95 | 6.8 | 28.5 | 55K |
| 2.6 | r-$Me_2Si(2MInd)_2HfMe_2$ | 0.497 | $DMAH^+B(pfp)_4^-$ | 0.86 | 10 | 1 | TOA | | 0.76 | 24 | | 24 | |

Part 3: Continuous High Temperature Solution Process

The polymerization reaction was performed in a stirred, liquid filled 2 L jacketed steel reactor equipped to perform continuous insertion polymerization in presence of an inert $C_6$ hydrocarbon (naphta) solvent at pressures up to 120 bar and temperatures up to 240° C. The reactor was typically stirred at 1000 rpm during the polymerization. The reaction system was supplied with a thermocouple and a pressure transducer to monitor changes in temperature and pressure continuously, and with means to supply continuously purified ethylene, 1-octene, and solvent. In this system, ethylene dissolved in the hydrocarbon solvent, 1-octene, tri-n-octyl aluminum (TOA) used as a scavenger, and optionally $H_2$, are pumped separately, mixed, and fed to the reactor as a single stream, refrigerated to −40° C. using liquid $NH_3$ as a coolant. The transition metal component (TMC) was dissolved in a solvent/toluene mixture (9/1 vol/vol) whereas the non-coordinating anion (NCA) activator was dissolved in toluene or slurried in the hydrocarbon solvent. Both components were pumped separately, mixed at ambient temperature, and cooled to −1° C. prior to entering the reactor. The reactor temperature was set by adjusting the temperature of an oil bath used as a reservoir for the oil flowing through the reactor wall jacket. Next, the polymer molecular weight (MW) or MI was controlled independently by adjusting the ethylene conversion (% $C_2$) in the reactor via the catalyst flow rate. Finally, the polymer density was controlled by adjusting the ethylene/1-octene weight ratio in the feed.

The results of ten polymerization experiments performed in the reactor described above with three different TMC's (A=rac-dimethylsilyl bis(1-indenyl) hafnium dimethyl, B=dimethylsilyl bis(2-methyl-4-phenyl-1-indenyl) hafnium dimethyl, and C=dimethylsilyl (tetramethylcyclopentadienyl)butylamino titatium dimethyl) and $[PhMe_2NH]B(pfp)_4]$ used as the activator (NCA) are summarized in Table 1. For example, the polymerization reaction in run #1 was carried out at 150° C. and 86.4 bar with A. Solvent, ethylene, and 1-octene were continuously fed to the reactor at a rate of 7 kg/hr., and 0.53 kg/hr., respectively, The 1-octene/ethylene weight ratio in the feed was 0.431 in this case. 3.5 mg/hr. of A dissolved in a 9/1 solvent/toluene (vol/vol) mixture and 4.9 mg/hr. of NCA dissolved in toluene were continuously fed to the reactor, resulting in an ethylene conversion of 80.5% and a 1-octene conversion of 43%. For a reactor residence time of 8 minutes, the polymer yield was 1.22 kg/hr. under these conditions. By adding TOA at a rate of 0.08 mmol/hr. to the feed, the catalyst productivity lined out around 348 kgPE/g A. This experiment resulted in an ethylene/1-octene copolymer containing 18.77 weight % comonomer (FTIR) with a weight-average MW of 88,000 g/mol (GPC), a polydispersity index of 2.1 (GPC), a MI of 1.4 dg/min., a density of 0.8991 g/cc, and a MIR (I21.6/I2) of 34.

At constant reactor temperature and feed composition, the polymer MW can be adjusted in this low pressure/high temperature polymerization process by controlling the ethylene conversion in the reactor via the catalyst flow rate;

typically, the higher the ethylene conversion, the lower the polymer MW (the higher the MI). The above examples showed that surprisingly both bridged bis (Cp) hafnocenes (A and B) exhibit superior MW and comonomer incorporation capability than the bridged mono(Cp) titanocene (C) does. For example, at 140° C. and with a 1-octene/ethylene weight ratio in the feed equal to about 0.43 to 0.44, A and B produced, respectively, a 1.6 MI/0.8937 g/cc copolymer at 87.9% ethylene conversion (run #3) and a 0.62 MI/0.8880 g/cc copolymer at 80.7% ethylene conversion (run #6), whereas (C) produced a 1.5 MI/0.9035 g/cc copolymer at a substantially lower ethylene conversion of 77.1% (run #9). Similarly, at 130° C. and with a 1-octene/ethylene weight ratio in the feed equal to about 0.93 to 0.94, A produced a 1.23 MI/0.8761 g/cc copolymer at 73.9% ethylene conversion (run #4), whereas (C) made a 3.2 MI/0.8866 g/cc copolymer at a lower ethylene conversion of 69.2% (run #10).

TABLE 3

| run # | TM | MW(TM) g/mol | TM mg/hr | ACT mg/hr | ACT/TM mol/mol | AIR3 mmol/hr | T °C. | P bar | $C_6$ sol kg/hr | $C_2$ kg/hr | $C_8$ kg/hr | $C_8/C_2$ kg/hr |
|---|---|---|---|---|---|---|---|---|---|---|---|---|
| 1 | A | 494.5 | 3.5 | 4.9 | 0.86 | 0.08 | 150.0 | 86.4 | 7.0 | 1.23 | 0.530 | 0.431 |
| 2 | A | 494.5 | 2.6 | 3.7 | 0.88 | 0.08 | 159.9 | 86.3 | 6.9 | 1.23 | 0.530 | 0.431 |
| 3 | A | 494.5 | 4.0 | 5.3 | 0.82 | 0.11 | 142.8 | 86.6 | 7.1 | 1.20 | 0.530 | 0.442 |
| 4 | A | 494.5 | 1.4 | 2.0 | 0.88 | 0.11 | 130.3 | 86.9 | 6.9 | 1.21 | 1.140 | 0.942 |
| 5 | B | 674.5 | 5.5 | 6.7 | 1.03 | 0.08 | 149.1 | 86.4 | 7.0 | 1.21 | 0.510 | 0.421 |
| 6 | B | 674.5 | 5.0 | 6.1 | 1.03 | 0.08 | 139.9 | 86.6 | 7.3 | 1.22 | 0.520 | 0.426 |
| 7 | C | 329.9 | 2.9 | 7.2 | 1.02 | 0.08 | 159.2 | 86.5 | 7.1 | 1.21 | 0.520 | 0.430 |
| 8 | C | 329.9 | 2.5 | 6.0 | 0.99 | 0.08 | 150.5 | 86.5 | 7.0 | 1.23 | 0.520 | 0.423 |
| 9 | C | 329.9 | 2.1 | 5.1 | 1.00 | 0.08 | 140.9 | 86.7 | 7.0 | 1.22 | 0.530 | 0.434 |
| 10 | C | 329.9 | 1.8 | 4.4 | 1.01 | 0.10 | 131.5 | 86.6 | 6.9 | 1.23 | 1.140 | 0.927 |

| $C_2$ % conv | $C_8$ % conv | Rt min | yield kg/hr | cat prod kg PE/g TM | MI dg/min | MIR 121.6/12 | density g/cc | $C_8$ inc. wt. % | Mw g/mol | PDI Mw/Mn |
|---|---|---|---|---|---|---|---|---|---|---|
| 80.5 | 43.0 | 8.0 | 1.22 | 348 | 1.40 | 34.0 | 0.8991 | 18.77 | 88000.00 | 2.1 |
| 73.1 | 33.1 | 8.0 | 1.047 | 413 | 1.20 | 32.2 | 0.9038 | 16.30 | 85000.00 | 2.1 |
| 87.9 | 54.9 | 7.9 | 1.35 | 336 | 1.60 | 53.7 | 0.8947 | 21.49 | 84000.00 | 2.0 |
| 73.9 | 34.8 | 7.9 | 1.29 | 922 | 1.23 | 31.6 | 0.8761 | 30.68 | | |
| 73.6 | 53.9 | 8.1 | 1.17 | 212 | 1.40 | 50.0 | 0.8915 | 23.65 | 95000.00 | 3.6 |
| 80.7 | 66.5 | 7.8 | 1.33 | 266 | 0.62 | 65.8 | 0.8880 | 26.05 | | 3.3 |
| 69.0 | 22.5 | 7.9 | .095 | 328 | 2.10 | 23.8 | 0.9121 | 12.22 | 91000.00 | 2.5 |
| 73.8 | 28.3 | 8.0 | 1.05 | 422 | 1.90 | 25.3 | 0.9082 | 13.98 | 91000.00 | 2.5 |
| 77.1 | 33.1 | 8.1 | 1.12 | 531 | 1.50 | 26.7 | 0.9035 | 15.66 | 97000.00 | 2.4 |
| 69.2 | 26.3 | 7.8 | 1.15 | 639 | 3.20 | 24.5 | 0.8866 | 25.97 | | |

Notes:
(1) For all runs the catalyst activator was [DMAH][B(pfp)4] and the scavenger was tri-n-octyl aluminum.
(2) Other abbreviations above include:
A = r-$Me_2Si(Ind)_2HfMe_2$
B = $Me_2Si(2\text{-}Me\text{-}4PhInd)_2HfMe_2$
C = $Me_2SiCp^*NbutylTiMe_2$
$C_2$ = ethylene
$C_8$ = 1-octene
$C_6$ = hydrocarbon (naphta)solvent

We claim:

1. A method for insertion polymerization of ethylene copolymers comprising contacting ethylene and one or more comonomers capable of insertion polymerization under homogeneous high pressure or solution process conditions at a temperature of not less than 120° C. and pressure not less than 20 bar with an ionic catalyst system having a cation derived from a bridged biscyclopentadienyl hafnium compound and a counterbalancing non-coordinating anion in the presence of a long-chain, linear-alkyl ligand-containing organoaluminum compound wherein the at least one long-chain, linear-alkyl ligand is $C_6$ or $C_7$ and the other ligands are independently selected from the group consisting of $C_4$ and higher linear, branched or cyclic alkyl groups.

2. The process of claim 1 wherein each ligand of said organoaluminum compound is a $C_6$ or $C_7$ long-chain, linear-alkyl ligand.

3. The method according to claim 1 wherein the ionic catalyst system is prepared by contacting said biscyclopentadienyl hafnium compound and a non-coordinating anion precursor compound in the polymerization medium or immediately prior to introduction therein.

4. The method according to claim 3 wherein said organoaluminum compound is introduction into the reaction vessel independently of the catalyst system and its components.

5. The method of claim 1 wherein said hafnium compound is the rac- or meso- isomer of dimethylsilyl bis (indenyl)hafnium dimethyl, dimethylsilyl bis(4,5,6,7-tetrahydroindenyl) hafnium dimethyl, dimethylsilyl bis(2-methyl-indenyl) hafnium dimethyl, dimethylsilyl bis(2-propyl-indenyl) hafnium dimethyl, dimethylsilyl bis(4-methyl, 2-phenyl-indenyl hafnium dimethyl, dimethylsilyl (cyclopentadienyl)(tetramethyl cyclopentadienyl) hafnium dibenzyl, dimethylsilyl bis(cyclopentadienyl) hafnium dimethyl, dibutylsilyl (fluorenyl) (cyclopentadienyl) hafnium dimethyl, dimethylsilyl (indenyl) (fluorenyl) hafnium dihydride, or i-propyl (cyclopentadienyl) (fluorenyl) hafnium dimethyl.

6. The method of claim 1 conducted under continuous, solution polymerization process conditions at a temperature of from 120° C. to 160° C. and 20 to 200 bar pressure.

7. The method of claim 1 conducted under high pressure polymerization process conditions, the pressure being at 500 to 2500 bar, and at a temperature above 150° C.

* * * * *

UNITED STATES PATENT AND TRADEMARK OFFICE

CERTIFICATE OF CORRECTION

PATENT NO. : 5,907,021

DATED : May 25, 1999

INVENTOR(S) : Howard William Turner, et. al.

It is certified that error appears in the above-identified patent and that said Letters Patent is hereby corrected as shown below:

Column 4, lines 7 & 8: "(4-methyl, 2-phenyl-indenyl)" should read "(2-methyl,4-phenyl-indenyl)"

Column 10, line 65: "(4-Me,2-PhInd)" should read "(2-Me,4-PhInd)"

Columns 11 & 12, Table 1, Example 1.19: "(4Me,2PhInd)" should read "(2Me,4PhInd)"

Claim 5, Column 16, lines 18 & 19: "(4-methyl, 2-phenyl-indenyl" should read "(2-methyl, 4-phenyl-indenyl)"

Signed and Sealed this

Eleventh Day of January, 2000

*Attest:*

Q. TODD DICKINSON

*Attesting Officer*

*Acting Commissioner of Patents and Trademarks*